Figure 1:
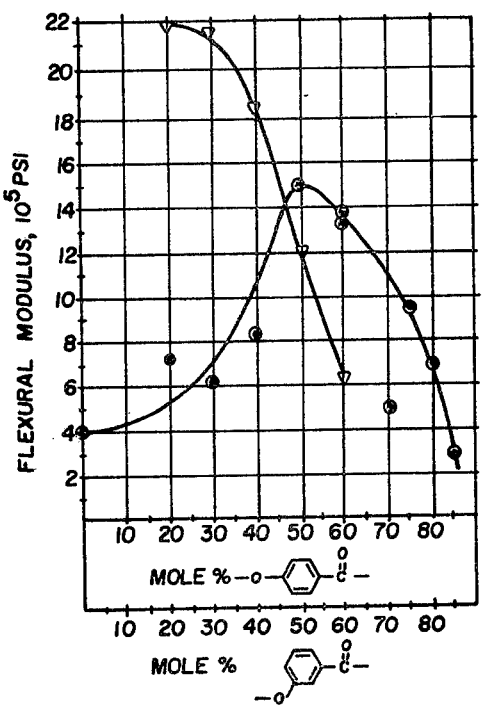

United States Patent [19]

Morris et al.

[11] 4,146,702

[45] Mar. 27, 1979

[54] LIQUID CRYSTAL COPOLYESTERS PREPARED FROM AN AROMATIC DICARBOXYLIC ACID, A SUBSTITUTED HYDROQUINONE AND A M-ACYLOXYBENZOIC ACID

[75] Inventors: John C. Morris; Winston J. Jackson, both of Kingsport, Tenn.

[73] Assignee: Eastman Kodak Company, Rochester, N.Y.

[21] Appl. No.: 822,985

[22] Filed: Aug. 8, 1977

[51] Int. Cl.² .................. C08G 63/18; C08G 63/66
[52] U.S. Cl. ................................. 528/191; 528/190; 528/193; 528/194
[58] Field of Search .............. 260/47 C; 528/191, 190, 528/193, 194

[56] References Cited

U.S. PATENT DOCUMENTS

| | | | |
|---|---|---|---|
| 3,773,858 | 11/1973 | Nowak et al. | 260/873 |
| 4,035,356 | 7/1977 | Jackson, Jr. et al. | 260/47 C |

*Primary Examiner*—Lester L. Lee

*Attorney, Agent, or Firm*—William P. Heath, Jr.; Daniel B. Reece, III

[57] ABSTRACT

Disclosed are copolyesters prepared from an aromatic dicarboxylic acid, a diacyl ester of a substituted hydroquinone and a m-acyloxybenzoic acid. These copolyesters contain the following divalent radicals:

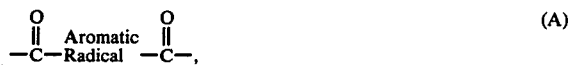

(A)

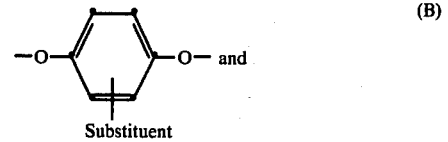

(B)

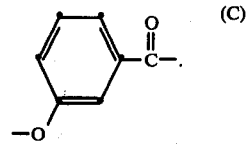

(C)

4 Claims, 2 Drawing Figures

LIQUID CRYSTAL COPOLYESTERS PREPARED FROM AN AROMATIC DICARBOXYLIC ACID, A SUBSTITUTED HYDROQUINONE AND A M-ACYLOXYBENZOIC ACID

This invention relates to copolyesters which exhibit unobvious mechanical properties.

The use of objects molded from synthetic polymers has expanded rapidly in the last several decades. In particular, polyesters have widely gained acceptance for general molding applications. Although most polyesters have mechanical properties suitable for general molding applications, most polyesters are not suitable for high strength service because the mechanical properties are not sufficiently high. One group of polyesters that is suitable for high strength service without the need of a reinforcing agent is a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat and fairly rigid along the long axis of the molecule and have chain extending linkages that are either coaxial or parallel.

Although the exact structure of liquid crystal polymers has not yet been fully understood, liquid crystal polymers are known to have exceptionally high mechanical properties compared to analogous polymers not having a liquid crystal character. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

Applicants have now invented liquid crystal copolyesters that exhibit mechanical properties sufficiently high to make the copolyesters suitable for various kinds of high strength service without the necessity of a reinforcing agent.

Very broadly, the copolyesters of this invention are comprised of the following divalent radicals:

(A)

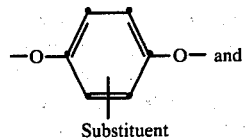

(B)

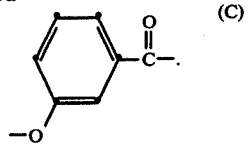

(C)

In this invention the amount of radical (C) is from about 20 to about 45 mole percent, based on the total moles of (A) and (C) combined.

Applicants are aware of a large volume of prior art relating to the copolyesters of this invention.

U.S. Pat. No. 3,778,410 discloses a process for preparing a polyester by reacting a polyester prepared from hydroquinone and terephthalic acid and a m-acyloxybenzoic acid.

U.S. Pat. No. 3,890,256 discloses liquid crystal polyesters prepared from poly(ethylene terephthalate), a substituted hydroquinone and a mixture of p- and m-acyloxybenzoic acids.

U.S. Pat. No. 3,637,595 discloses liquid crystal copolyesters which are prepared from terephthalic acid, hydroquinone and p-hydroxybenzoic acid.

U.S. Pat. No. 3,804,805 discloses liquid crystal polyesters prepared from polyethylene terephthalate and a mixture of p- and m-acryloxybenzoic acids.

Belgium Pat. No. 828,935 discloses liquid crystal polyesters wherein a substantial portion of the rings in the polymer chain contain a substituent or a substantial portion of the rings in the polymer chain have chain extending linkages which are neither coaxial or parallel.

German Offenlegunsschrift No. 2,520,820 contains a disclosure similar to Belgium Pat. No. 828,935.

Applicants regard the closest prior art to be U.S. Pat. Nos. 3,778,410 and 3,890,256.

The copolyesters of this invention are thought to be novel over U.S. Pat. No. 3,778,410 because the copolyesters of this invention are limited to a specific range of divalent radical contributed from a m-acyloxybenzoic acid and also because the process disclosed in this patent cannot be used to prepare the copolyesters of this invention. The copolyesters of this invention are thought to be unobvious over this patent because the process of this patent cannot be used to prepare the copolyesters of this invention. In Column 6, lines 16–19 of this patent it is reported that the starting polyester and acyloxy aromatic carboxylic acid can be "mixed and heated until molten". This patent reports that reaction temperatures up to 350° C. can be used. Since the melting point of a starting copolyester of the dicarboxylic acid of this invention and a substituted hydroquinone is considerably higher than 350° C., this starting copolyester cannot be reacted with a m-acyloxybenzoic acid in the process disclosed in the patent.

The copolyesters of the invention are novel over U.S. Pat. No. 3,890,256 because the copolyesters of this invention are limited to a polyester "consisting essentially of" the various divalent radicals and the polyesters disclosed in this patent contain substantial quantities of ethylene glycol.

The copolyesters of this invention are thought to be unobvious over U.S. Pat. No. 3,890,256 for two reasons.

First, the process disclosed in this patent cannot be used to prepare the copolyesters of this invention. In Column 9, line 63 of this patent it is reported that the starting polyester and acyloxy aromatic carboxylic acid can be "mixed and heated until molten". This patent reports that reaction temperatures up to 350° C. can be used. Since the melting point of the starting copolyester of the dicarboxylic acid of this invention and a substituted hydroquinone is considerably higher than 350° C., this starting copolyester cannot be reacted with a m-acyloxybenzoic acid in the process disclosed in this patent.

The copolyesters of this invention are also thought to be unobvious over U.S. Pat. No. 3,890,256 because the flexural modulus and tensile strength of the copolyesters of this invention, containing the divalent radical

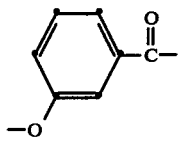

contributed from a m-acyloxybenzoic acid, are unobviously higher than the flexural modulus and tensile strength of corresponding polyesters disclosed in this patent containing the same mole percent of the divalent radical

contributed from a p-acyloxybenzoic acid. Stated another way, it would be unobvious that one could obtain enhanced flexural modulus and tensile strength by substituting the

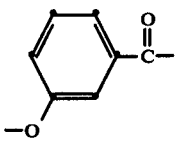

radical in the form of a divalent radical contributed from a m-acyloxybenzoic acid for the

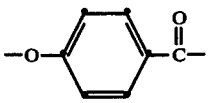

radical in the form of a divalent radical contributed from a p-acyloxybenzoic acid.

The precise manner in which the flexural modulus and tensile strength of the polyesters of the invention are unobvious over the flexural modulus and tensile strength of the polyesters disclosed in U.S. Pat. No. 3,890,256 is illustrated in FIGS. 1 and 2.

Figure 2:
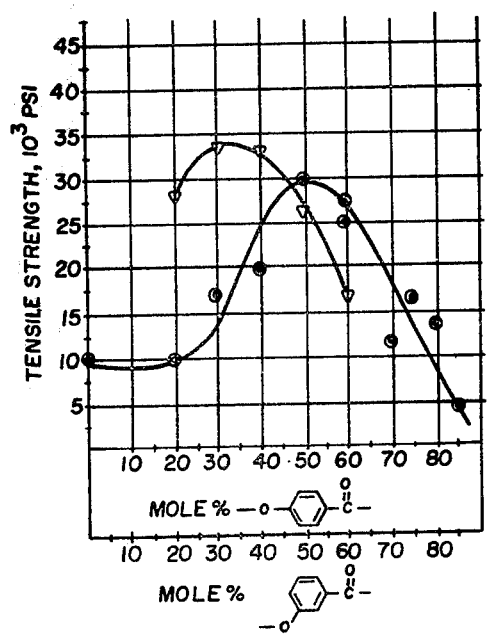

FIG. 1 is a graph showing the relationship between the flexural modulus of the copolyesters of the invention and the amount of divalent radical

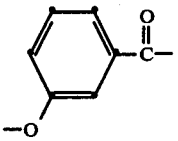

in the copolyester of the invention and the flexural modulus of the polyester of the prior art and the amount of divalent radical

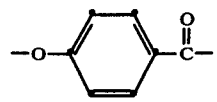

in the polyester of the prior art. The flexural modulus of the copolyester of the invention is represented by the upper line connecting the triangular data points. The flexural modulus of the polyester of the prior art is represented by the lower line connecting the circular data points.

FIG. 2 is a graph similar to FIG. 1 and shows the relationship between the tensile strength of both polyesters and the amount of each divalent radical in each polyester.

In each of the Figures, a double abscissa has been used. On the lower abscissa, which corresponds to the upper line representing the copolyesters of the invention, there has been plotted the mole percent of divalent radical (C)

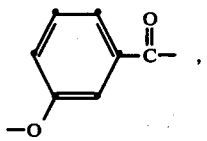

based on the total moles of radical (A) and radical (C) combined. On the upper abscissa, which corresponds to the lower line representing the polyester of the prior art, there has been plotted the mole percent of divalent radical

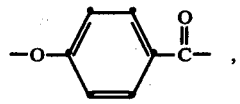

based on the total moles of the divalent radical contributed from the dicarboxylic acid and this radical combined. The same scale has been used on each abscissa for the amount of each of the two divalent radicals. Thus, one can obtain a direct comparison between the copolyester of the invention and the polyester of the prior art, each containing the same amount of each of the two radicals.

On the ordinate of FIG. 1 there has been plotted the flexural modulus in $10^5$ psi. On the ordinate of FIG. 2 there has been plotted the tensile strength in $10^3$ psi.

The data used in the Figures to illustrate the copolyesters of the invention were obtained by preparing the copolyesters and determining the flexural modulus and tensile strength of each of the injection-molded copolyesters.

The copolyesters of the invention were prepared by a conventional acidolysis procedure whereby a dicarboxylic acid, a diacyl ester of a substituted hydroquinone and a m-acyloxybenzoic acid are contacted under an increasing temperature ranging up to about 340°–380° C. and a decreasing pressure to form a high molecular weight polymer. As a specific example, the copolyester of the invention containing 30 mole percent of the radical contributed from a m-acyloxybenzoic acid was prepared by the following procedure.

A mixture of 93 g. (0.56 mole) terephthalic acid, 116.5 g. (0.56 mole) methylhydroquinone diacetate, and 43.2 g. (0.24 mole) m-acetoxybenzoic acid was placed in a 500-ml flask equipped with a stirrer, a short distillation column, and an inlet for nitrogen. The flask was evacuated and purged three times with nitrogen before being lowered into a Wood's metal bath at 275° C. The mixture was stirred for one hour at 275° C. under nitrogen while most of the acetic acid distilled. The temperature was raised to 300° for 30 minutes to insure complete reaction of the terephthalic acid. The temperature was then gradually raised to 350° C. over the next 30 minutes, and a vacuum of 0.5 mm was applied. The temperature was raised to 360°–370° C. and the polymerization was complete within about 20 minutes. The polymer had an inherent viscosity of 0.87.

The other copolyesters containing 20, 40, 50 and 60 mole percent divalent radical (C) were prepared by a similar procedure.

The flexural modulus and tensile strength were determined in accordance with ASTM D790 and ASTM D1708.

The data for the flexural modulus and tensile strength for the polyester of the prior art were taken directly from the Figures of U.S. Pat. No. 3,890,256.

The unobviously higher flexural modulus of the polyesters of the invention compared to the flexural modulus of the polyesters of the prior art can be fully appreciated by a detailed consideration of the data reported in FIG. 1. For example, consider a typical polymer of the invention containing 30 mole percent of the divalent radical

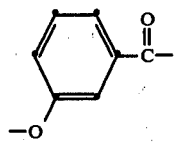

and a corresponding polyester of the prior art containing 30 mole percent radical

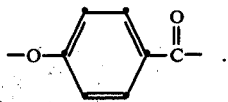

The flexural modulus of the polyester of the prior art is around $6 \times 10^5$ psi, while the flexural modulus of the copolyester of the invention is over $21 \times 10^5$ psi, or about a 250% increase over the prior art.

In a similar manner, the unobviously high tensile strength of the copolyesters of the invention compared to the tensile strength of the polyesters of the prior art can be fully appreciated by considering the data reported in FIG. 2. For example, the tensile strength of a polyester of the prior art containing 30 mole percent of the radical

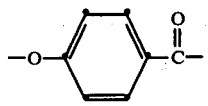

is around $17 \times 10^3$ psi, while the tensile strength for the corresponding copolyester of the invention containing 30 mole percent of the radical

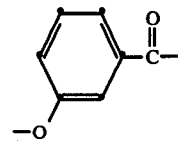

is about $33 \times 10^3$ psi, or an increase of about 94%.

The dicarboxylic acid that contributes divalent radical (A) to the copolyesters of the invention corresponds to the formula

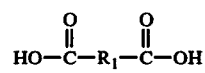

wherein

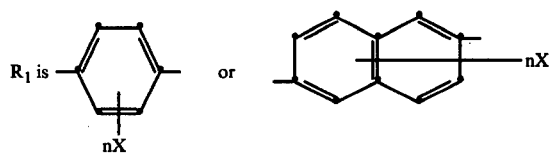

In these structures X is Cl-, Br-, or a monovalent alkyl radical having one to three carbon atoms and n is 0, 1 or 2.

Examples of dicarboxylic acids that can be used to prepare the copolyester of the invention are terephthalic acid, 2-methyl terephthalic acid, 2-propyl terephthalic acid, 2-chloro terephthalic acid, dibromo terephthalic acid, 2,6-naphthalenedicarboxylic acid, 4-methyl-2,6-naphthalenedicarboxylic acid, 1-chloro-2,6-naphthalenedicarboxylic acid, and the like. Terephthalic acid is preferred.

The diacylester of substituted hydroquinone that contributes divalent radical (B) to the copolyesters of the invention corresponds to the structure

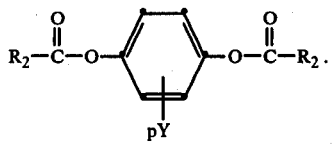

In this structure Y is Cl-, Br- or monovalent alkyl radical having one to three carbon atoms, p is 1 or 2, and $R_2$ is phenyl or a monovalent alkyl radical of 1 to 8, preferably 1 to 4, carbon atoms. Examples of diacyl esters of substituted hydroquinone that can be used to prepare the copolyesters of this invention include 2-chlorohydroquinone diacetate, 2-methylhydroquinone dipropionate, 2,6-dimethylhydroquinone dibutyrate, 2,6-dimethylhydroquinone dibenzoate, and 2,5-dichlorohydroquinone dipropionate. The 2-methyl and 2-chloro species are preferred.

The m-acyloxybenzoic acid that contributes divalent radical (C) to the copolyesters of this invention corresponds to the structure

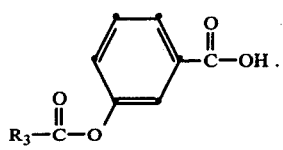

In this structure R₃ is phenyl or a monovalent alkyl radical of 1 to 8, preferably 1 to 4, carbon atoms. Examples of m-acyloxybenzoic acid include m-acetoxybenzoic acid, m-propionyloxybenzoic acid, m-butyryloxybenzoic acid, and m-phenoxybenzoic acid. Preferably, R₃ is a monovalent alkyl radical having one carbon atom, in which case the m-acyloxybenzoic acid is m-acetoxybenzoic acid.

The copolyesters of this invention are described as "consisting essentially of" the various radicals. By the term "consisting essentially of" we mean that the copolyester can contain other divalent radicals, even in significant amounts, as long as the flexural modulus and tensile strength values of the copolyesters of the invention remain unobvious in view of the flexural modulus and tensile strength values of the copolyesters of the prior art. For example, minor amounts of substituted or unsubstituted naphthalenedicarboxylic acid isomers, such as 2,7-, 1,4-, 1,5- and 1,6-, can be used in addition to the 2,6-isomer. Also dicarboxylic acids other than substituted or unsubstituted terephthalic acid or 2,6-naphthalenedicarboxylic acid can be used. Other diols, such as a substantial amount of unsubstituted hydroquinone, can be used. Similarly, a portion of the m-acyloxybenzoic acid can be replaced with p-acyloxybenzoic acid. By the term "consisting essentially of" we mean also that the copolyesters of this invention can contain nucleating agents, fillers, pigments, glass fibers, asbestos fibers, antioxidants, stabilizers, plasticizers, lubricants, fire-retardants, and other additives.

The inherent viscosity of the copolyesters of this invention is at least 0.4, but can vary widely upward from 0.4. In one embodiment the inherent viscosity of the copolyester is at least 0.6. The inherent viscosity of the copolyester can, if desired, be increased still further to an inherent viscosity of 0.7, 1.0, or even higher, using techniques well known in the art for increasing the molecular weight of linear polyesters, such as solid-state polymerization at 210° to 280° C. under reduced pressure or in a fluidized bed.

The inherent viscosity of the copolyesters of this invention is measured at 25° C. using 0.50 gram of polymer per 100 ml. of a solvent composed of 60 volumes of phenol and 40 volumes of tetrachloroethane.

The copolyesters of this invention are useful for preparing molded objects, films, fibers and the like.

The copolyesters of this invention are used to prepare useful articles using conventional methods and conventional apparatus. For instance, the copolyesters can be formed into fibers by conventional melt spinning techniques and further processed according to techniques well known in the art. The copolyesters can be injection molded using conventional equipment and techniques.

We claim:

1. A copolyester having an inherent viscosity of at lease 0.4 measured at 25° C. using 0.50 gram of polymer per 100 ml. of a solvent composed of 60 volumes of phenol and 40 volumes of tetrachloroethane consisting essentially of the following divalent radicals:

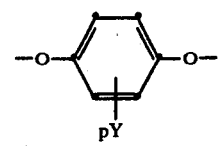

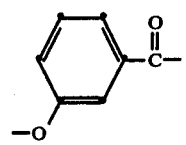

wherein

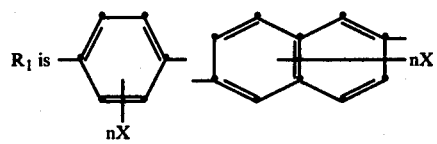

wherein X is Cl-, Br-, or a monovalent alkyl radical having one to three carbon atoms and n is 0, 1 or 2, In radical (B) Y is Cl-, Br-, or a monovalent alkyl radical having one to three carbon atoms and p is 1 or 2, and The amount of radical (C) is from about 20 to about 45 mole percent, based on the total moles of (A) and (C) combined.

2. The copolyester of claim 1 wherein radical (A) is

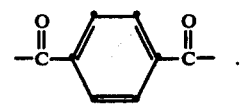

3. The copolyester of claim 1 wherein radical (B) is

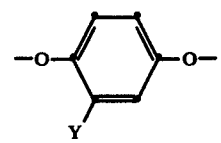

wherein Y is Cl- or CH₃-.

4. A cpolyester having an inherent viscosity of at lease 0.6 measured at 25° C. using 0.50 gram of polymer per 100 ml. of a solvent composed of 60 volumes of phenol and 40 volumes of tetrachloroethane consisting essentially of the following divalent radicals:

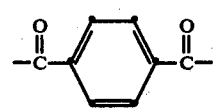

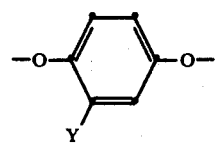

(C) 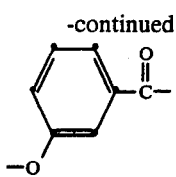
wherein
Y is Cl- or CH₃, and
the amount of radical (C) is from 20 to 45 mole percent, based on the total moles of radical (A) and radical (C) combined.
* * * * *